US012184675B2

(12) United States Patent
Zulkernine et al.

(10) Patent No.: US 12,184,675 B2
(45) Date of Patent: Dec. 31, 2024

(54) METHOD AND APPARATUS FOR DETECTING ATTACK ON TRAIN CONTROL SYSTEMS

(71) Applicant: Irdeto Canada Corporation, Ottawa (CA)

(72) Inventors: Mohammad Zulkernine, Kingston (CA); Amin Fakhereldine, Kingston (CA); Dan Murdock, Kingsville (CA)

(73) Assignee: Irdeto B.V., Hoofddorp (NL)

( * ) Notice: Subject to any disclaimer, the term of this patent is extended or adjusted under 35 U.S.C. 154(b) by 253 days.

(21) Appl. No.: 17/979,344

(22) Filed: Nov. 2, 2022

(65) Prior Publication Data

US 2023/0144438 A1    May 11, 2023

Related U.S. Application Data

(60) Provisional application No. 63/277,670, filed on Nov. 10, 2021.

(51) Int. Cl.
*H04L 29/06* (2006.01)
*H04L 9/40* (2022.01)
*H04L 41/16* (2022.01)

(52) U.S. Cl.
CPC .......... *H04L 63/1416* (2013.01); *H04L 41/16* (2013.01); *H04L 63/1466* (2013.01)

(58) Field of Classification Search
CPC ................. H04L 63/1416; H04L 63/1466
See application file for complete search history.

(56) References Cited

U.S. PATENT DOCUMENTS

| | | | |
|---|---|---|---|
| 2019/0217869 A1* | 7/2019 | Takeuchi | G06F 11/3013 |
| 2022/0272122 A1* | 8/2022 | Kaabouch | H04W 12/122 |

FOREIGN PATENT DOCUMENTS

| | | | | |
|---|---|---|---|---|
| CN | 113904862 A | * | 1/2022 | |
| WO | WO-2014061021 A1 | * | 4/2014 | B60R 16/023 |

OTHER PUBLICATIONS

English translation of cn113904862A (Year: 2022).*

* cited by examiner

*Primary Examiner* — Jason K Gee
(74) *Attorney, Agent, or Firm* — Rimon PC; Marc S. Kaufman

(57) ABSTRACT

A system and method for train control system intrusion detection that uses Machine Learning (ML) to detect attacks on traction and braking operations performed by a TCMS. Control message history, which includes previously generated operational commands and control messages sent to each train and mobility information for each train at predetermined time intervals, is received. The received input data is checked for misbehavior and detect attacks.

20 Claims, 4 Drawing Sheets

METHOD AND APPARATUS FOR DETECTING ATTACK ON TRAIN CONTROL SYSTEMS

RELATED APPLICATION DATA

This application claims benefit of U.S. Provisional Application Ser. No. 63/277,670 filed on Nov. 10, 2021, the disclosure of which is incorporated herein by reference.

BACKGROUND

Recent technological trends have led to connecting critical infrastructure and systems to the internet to provide smart solutions, such as establishing smart cities and producing smart vehicles. Similarly, there has been an evolution in the railway industry to "smart railway" in which trains are connected to the internet to communicate remotely with their control centers and receive operational commands to thereby improve the efficiency and safety of railway transportation services.

Moreover, smart railway provides convenience and entertainment services for passengers such as offering Wi-Fi access and high-quality voice and video broadcasting. These services require high network availability, real-time transmissions and, most importantly, security. However, connecting trains to the internet makes them increasingly vulnerable to cyber-attacks. Attackers can exploit vulnerabilities in security of the networks, operating systems, and communication protocols to disrupt systems. For example, a cyber-attack on railway systems took place in Poland in 2008. Four trains derailed after a hacker succeeded in controlling a railway switch. Another attack took place in China in 2012 on one of the trains in the Shenzhen Subway. In this attack, an interference attack was launched from a passenger's device on the train's network. Emergency brakes were activated to protect the passengers' safety; however, the attack degraded the efficiency of operations and caused inconvenience for passengers. Further, cyber-attacks on railway systems can cause other hazardous consequences such as front-rear collisions. Therefore, it is critical to provide security mechanisms to detect and mitigate attacks on these systems and protect their efficiency and safety.

Additionally, regulatory and standardization activities, like the Network Information Security (NIS) directive (https://eur-lex.europa.eu/legal-content/EN/TXT?uri=uriserv:OJ.L.2016.194.01.0001.01.ENG&toc=OJ:L:2016:194:TOC) from the EU are beginning to mandate increased detection and notification measures within the rail industry for attacks and anomalies in inter-train and intra-train communications networks.

Communication-based Train Control (CBTC) systems are train control systems that implement automatic train operations and protection. There is a trend towards adopting CBTC systems to replace traditional train control systems. Operations in these systems are based on bidirectional communication between trains and infrastructural equipment known as "wayside components." These communications are used for reliable exchange of safety-critical information and train operational commands. A critical component of the system in trains is the Train Control and Monitoring System (TCMS). The TCMS is responsible for controlling and monitoring the train and performing different functionalities, including traction and braking. Modern trains are adopting Ethernet-based solutions to perform TCMS operations more efficiently. However, these solutions provide additional attack vectors and thus further threaten security of the Train Communication Network (TCN) (an IEC 61375-1 standard).

As shown in FIG. 1, CBTC system 100 can include three groups of components. The first group is the wayside components. Zone Controller (ZC) 102 receives and analyzes mobility information from all trains in a physical zone associated with the ZC, computes speed profiles and sends operational commands to trains to control their movement. If a train deviates from safe operation, ZC 102 commands it to adjust its velocity and acceleration. Automatic train supervisor (ATS) 104 monitors the traffic on railways to determine free and occupied routes during specific time intervals. Its reports are used by computer interlocking (CI) 106 to set routes for trains while ensuring that no two trains can occupy the same route at the same time. Data storage unit (DSU) 108 stores and provides logs of the network and mobility data.

The second group of components in CBTC system 100 are on-board components. Each train can have automatic train protection (ATP) 110 that ensures that trains are operating safely and in compliance with the wayside operational commands. In case of speed deviations, ATP 110 commands automatic train operation (ATO) 112 (also on each train) to adjust the train's velocity, and to apply emergency brakes when the velocity exceeds the safety threshold. ATO 112 analyzes the wayside operational commands and the train's mobility data and computes a speed profile to control the movement of the train. This profile is used to apply traction and braking operations on the intra-train network.

The third group of components in CBTC system 100 are data communication systems (DCS). DCS include wired and wireless communications in CBTC systems and facilitate the bidirectional communication between trains and wayside components using wireless communication technologies specific to railways e.g., Global System for Mobile Communications for Railway (GSM-R), Long Term Evolution for Railway (LTE-R) and IEEE 802.11. In addition, DCS include communication technologies used on the intra-train network such as Ethernet Train Backbone (ETB) (IEC 61375-2-5 standard) and Ethernet Consist Network (ECN) (IEC 61375-3-4 standard). These technologies facilitate the operations of the Train Control and Monitoring System (TCMS).

Operations in CBTC systems are based on communication between trains and wayside components through DCS. An overview of the communication architecture and cycle is shown in FIG. 2. Each train sends periodically its physical mobility information 302 to the wayside components 102, 104, 106, and/or 108 in its vicinity. Based on the collected and analyzed mobility information data and local track conditions, wayside components send back control messages 304, which can include operational commands, to the trains to ensure safe and efficient operations on the railway. Two essential messages for the movement of trains, which can be included in control messages 304, are Movement Authority (MA) and Speed Restriction Profile (SRP). MA determines how far a train can move safely by identifying a stopping point. SRP determines the speed limit that a train can move at within a certain time interval or a certain area. In case a specific train is deviating from safe operations, wayside components send operational commands to adjust the speed of the train. A train adjusts its movement by applying traction or braking operations through intra-train communications over the TCN. These operations are processed by the TCMS, which is responsible for different functions inside the train (e.g., traction, braking, controlling the doors, lighting, and HVAC).

Attackers can attack transmissions over the TCN and disrupt traction and braking operations of the TCMS. Known intrusion detection systems are oriented towards detecting intrusions and misbehavior by analyzing network data.

SUMMARY OF THE INVENTION

Disclosed implementations can be integrated into wayside equipment and include an IDS that monitors mobility information of trains to detect attacks on traction and braking operations of TCMS. As noted above, wayside components of CBTC systems issue operational commands and speed adjustments for trains in their vicinity. The disclosed implementations leverage these operational commands to analyze mobility data and detect attacks using ML techniques.

A first aspect of the invention is an intrusion detection method for detecting attacks on train operations which are performed by a Train Control and Monitoring System (TCMS), the method comprising: receiving control message history information indicating previously generated operational commands for directing operations on one or more trains; receiving mobility data of the one or more trains; performing a first intrusion check for attacks on a specific train based on the mobility data and position, displacement, velocity and/or acceleration of the specific train; perform a second intrusion check by applying a machine learning engine to the variance of displacement, velocity, and acceleration of the specific train between at two predetermined times to classify the mobility data into normal mobility data and attacking mobility data; and generating an attack message when at least one of the checking step and the applying step indicates an attack whereby the attack message can be used to mitigate damage resulting from the attack.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative implementations. It should be understood, however, that the invention is not limited to the precise arrangements and instrumentalities shown. In the drawings.

DETAILED DESCRIPTION

As noted above, with known intrusion detection systems, attacks can go undetected by the train driver until a hazardous consequence becomes obvious, like a collision or derailment. For example, where an attacker is capable of performing a Denial-of-Service (DoS) attack and data-tampering attacks on traction and braking operations transmitted over the TCN, the values of velocity and acceleration of the train recommended by wayside components could be modified/interrupted. In other words, the train might not be moving in compliance with the correct operational commands sent by the wayside components to ensure safety and efficiency.

Therefore, it is critical to provide security mechanisms capable of detecting abnormalities in the train's behavior which indicate attacks on traction and braking operations of TCMS. Disclosed implementations include an Intrusion Detection System (IDS) that uses Machine Learning (ML) to detect attacks on traction and braking operations performed by the TCMS of a train.

Figure 3:
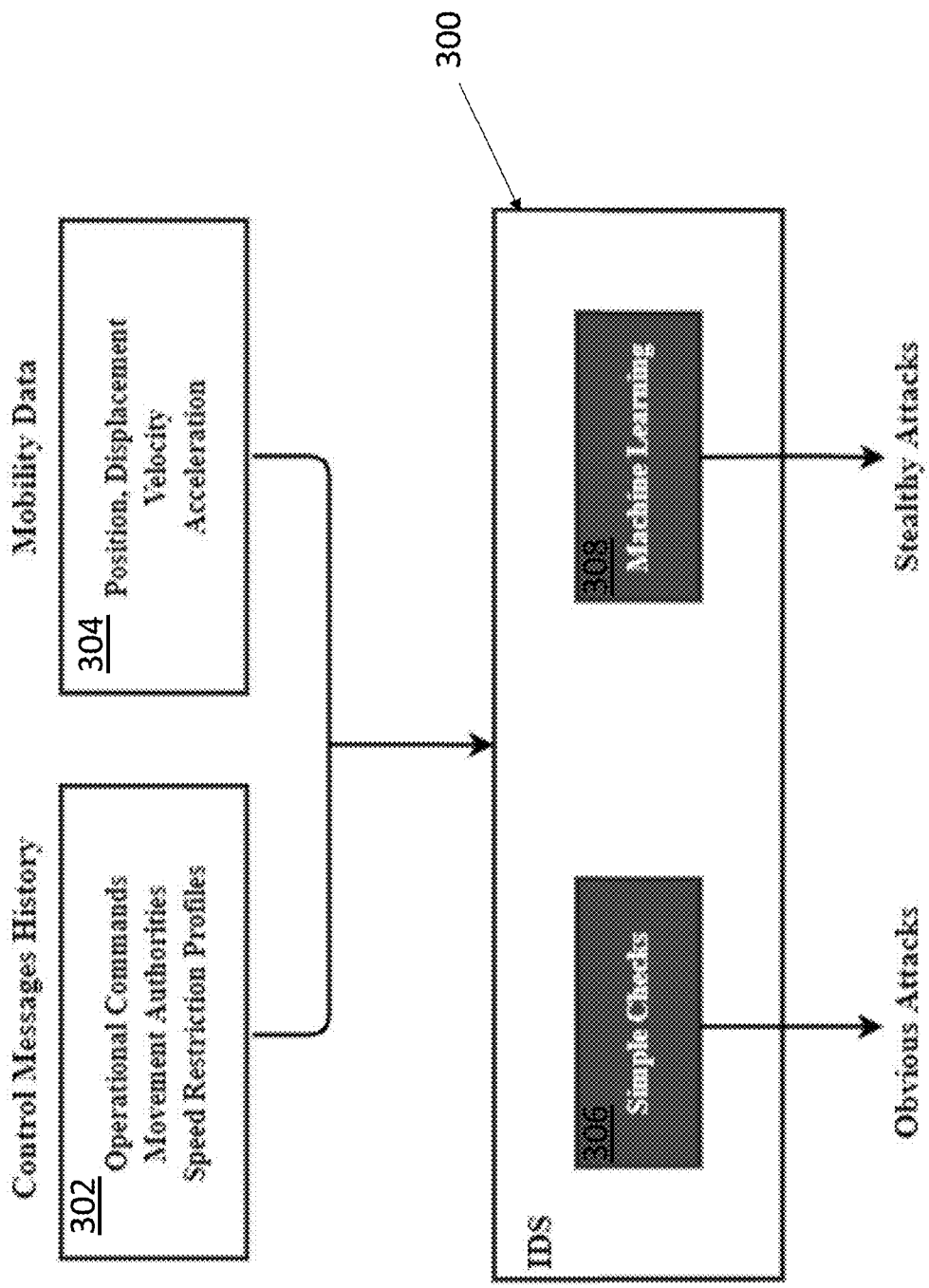
FIG. 3 is an architectural diagram of an intrusion detection system in accordance with disclosed implementations.

FIG. 3 illustrates an overview of an IDS 300 in accordance with an example of disclosed implementations. IDS 300 receives control message history 302, which includes previously generated operational commands and control messages sent to each train, such as MAs and SRPs. In addition, IDS 300 receives mobility information 304 of each train (for example, position, displacement, velocity and acceleration) continuously or at predetermined time intervals. The IDS then analyzes the received input data to check for misbehavior and detect attacks in the manner described in detail below.

For example, assume that the displacement, velocity, and acceleration of an arbitrary train at time step t are $d^t$, $v_t$, and $a_t$, respectively. It follows those equations (1), (2), and (3) below should always be satisfied to ensure safe operations. The ranges on the righthand side of these equations are safety intervals and can be derived, in a conventional manner, from normal, attack-free trains' operations. IDS 300 can simple checks module 306 to check if equations (1), (2), and (3) are satisfied. If not, it can be assumed that an attack on traction or braking is taking place inside the train.

$$d^t \in [d_{min}^t, d_{max}^t] \quad (1)$$

$$v^t \in [v_{min}^t, v_{max}^t] \quad (2)$$

$$a^t \in [a_{min}^t, a_{max}^t] \quad (3)$$

Moreover, if it is assumed that attackers can perform stealthy attacks on traction and braking operations by changing the values of velocity and acceleration while satisfying equations (1), (2), and (3), further intrusion detection can be accomplished to detect such attacks. IDS 300 employs ML model 308, disclosed in detail below, to detect these types of attacks by classifying mobility data into normal and attacking data. Simple checks module 306 and ML model 308 can run in parallel to detect attacks while trains are in operation.

To train ML model 308 of IDS 300, the differences in displacement, velocity and acceleration of a train between two consecutive time steps are used. Therefore, instead of using $d^t$, $v^t$, and $a^t$ we rely on the features of $\Delta d^{t,t-1}$, $\Delta v^{t,t-1}$, $\Delta a^{t,t-1}$, computed using equations (4), (5) and (6) below.

$$\Delta d^{t,t-1} = d^t - d^{t-1} \quad (4)$$

$$\Delta v^{t,t-1} = v^t - v^{t-1} \quad (5)$$

$$\Delta a^{t,t-1} = a^t - a^{t-1} \quad (6)$$

These features indicate how displacement, velocity, and acceleration evolve between two consecutive time steps and help the ML model learn this behavior, in a normal situation and/or under an attack situation, to detect attacks. Three plausibility checks can be integrated to enhance the performance of the classifiers of ML model 308. The plausibility checks can be based on normal, attack-free behavior of trains. The values of $\Delta d^{t,t-1}$, $\Delta v^{t,t-1}$, $\Delta a^{t,t-1}$ should fall within safety intervals when a train runs under normal operation. A plausibility score can be assigned to each train, with an initial value equal to zero. While the train is running, if the value of $\Delta d^{t,t-1}$ does not fall within its safety interval, the plausibility score is incremented by, for example, 1. The same check and incrementation can be made for $\Delta v^{t,t-1}$, $\Delta a^{t,t-1}$. Therefore, in this example, the plausibility score can have an integer value between zero and three. A score equal to zero indicates that the movement is highly plausible (normal), while a score equal to three indicates that the movement is highly implausible (possible attack). Finally, if IDS 300 detects an attack, it determines its type. For example, it characterizes the attack based on criteria such as the nature of the attack (adding additional messages, tampering with existing messages, blocking messages) and target (traction/drive control, braking control, etc.) where possible. This is typically determined with an understanding of the message contents and the physical parameters of the train and it's operation.

IDS 300 can be implemented at the wayside level (e.g., in wayside equipment, near wayside equipment, and/or or in direct communication with wayside equipment) so that IDS 300 can analyze the mobility information received from each train and determine if the trains are moving in compliance with safety recommendations and operational commands or not. Consequently, IDS 300 can detect anomalous behavior implying the presence of attacks on traction or braking operations inside the train. Another reason for implementing IDS 300 at the wayside level is that, under a compromised intra-train network, wayside components are more reliable than train on-board components to detect attacks.

Figure 1:
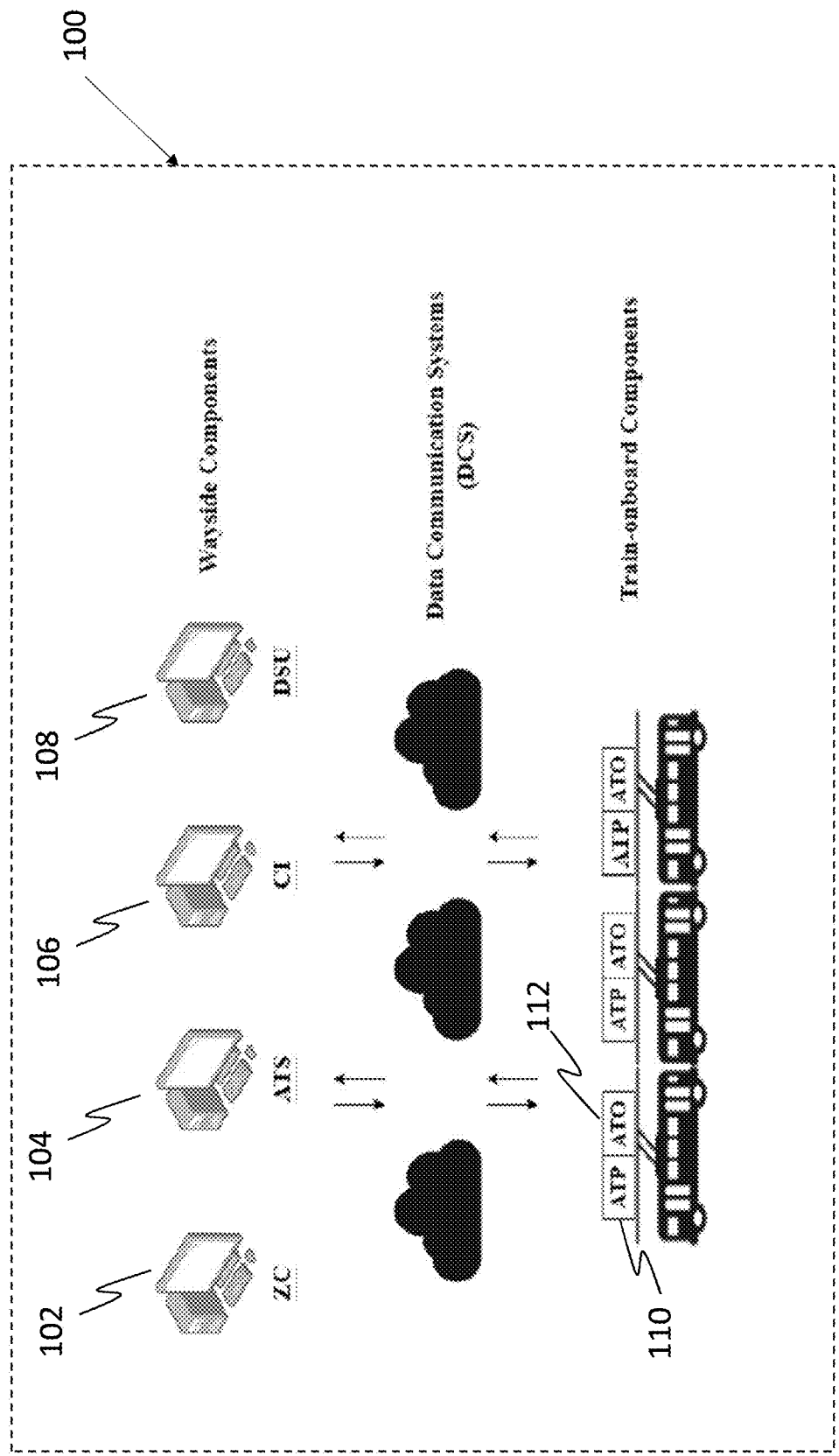
FIG. 1 is an architectural diagram of CBTC system.
Figure 2:
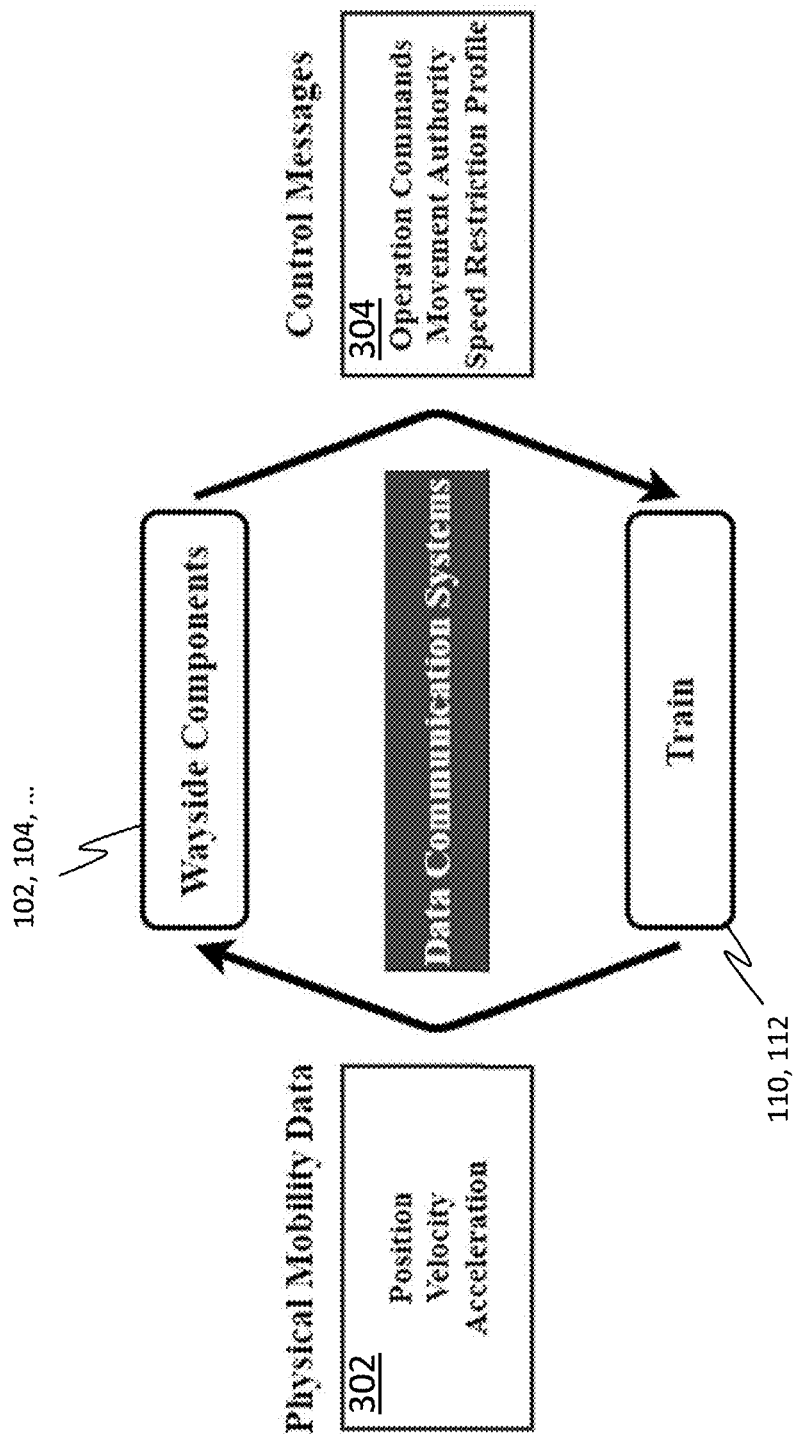
FIG. 2 is flow diagram of CBTC system message cycles.
Figure 4:
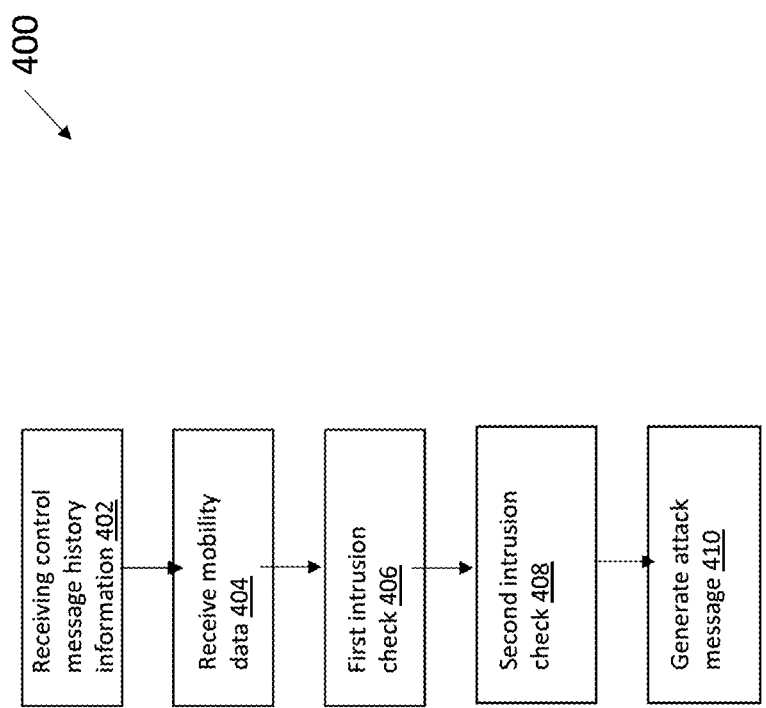
FIG. 4 is a flow chart of an intrusion detection method in accordance with disclosed implementations.

FIG. 4 illustrates an intrusion detection method 400 for detecting attacks on train operations in accordance with disclosed implementations. The steps of FIG. 4 can be accomplished by wayside equipment (such as ZC 102, ATS 104, CI 106, and DSU 108 or FIG. 1). At step 402, control message history information indicating previously generated operational commands for directing operations on one or more trains is received. At step 404, mobility data of the one or more trains is received. At step 406, a first intrusion check is performed for attacks on a specific train based on the mobility data and position, displacement, velocity and/or acceleration of the specific train. At step 408, a second intrusion check is performed by applying a machine learning model to the variance of displacement, velocity, and acceleration of the specific train between at two predetermined times to classify the mobility data into normal mobility data and attacking mobility data. At step 410, an attack message is generated when at least one of the first intrusion check and the second intrusion check indicate an attack whereby the attack message can be used to mitigate damage resulting from the attack.

The inventors conducted an experiment to evaluate an IDS in accordance with the disclosed implementations. A realistic case study was simulated on part of the railway in the city of Berlin, Germany. The network was simulated using Simulation Urban Mobility (SUMO), a simulator for vehicular networks. A Traffic Control Interface (TraCI), a tool that allows retrieval and manipulation of vehicles' simulation values, was integrated with SUMO. Open Street Map (OSM) was used to obtain a realistic map of railroads in Berlin. OSM is a free editable map of the whole world and can generate network files compatible with SUMO to perform simulations. In addition, OSM provides the real maximum velocity a train can move at on each railroad segment. 100 train trips performed by 20 trains that depart at different times was simulated over 5 rounds. The trains were assumed to be 120 meters long and to have a maximum velocity 40 m/s, acceleration of 3 m/s², deceleration of 1.5 m/s², and emergency deceleration of 2 m/s².

In the attack model, an attacker who performs only stealthy attacks on traction and braking operations transmitted on the Train Communication Network (TCN) was considered. Data-tampering attacks were simulated by changing the value of the recommended velocity at different time steps. Out of 100 trips, 25 trips were "attacked" while changing the attacked trains in each round to include randomness. The algorithm below was implemented to simulate the attacks at each time step.

```
function ATTACK(train_id, attacked_trains, attack_type)
    if train_id ∈ attacked_trains then
        p = randomFloat(0, 1)
        if p ≤ 0.35 then
            if attack_type == down_speeding then
                velocity = velocity × randomFloat(0.6, 0.8)
            end
            if attack_type == over_speeding then
                velocity = velocity × randomFloat(1.2, 1.4)
            end
            duration = randomInt(1, 3)
            change_velocity(train_id, velocity, duration)
        end
    end
end function
```

The algorithm receives as input a train's ID, a list of IDs of the trains to be attacked during each round, and the type of attack to be performed. Traction is attacked by applying a down speeding attack that pushes the velocity below the value recommended by wayside components. Conversely, braking is attacked by applying an over speeding attack that pushes the velocity above the recommended value. To make the attack more sophisticated, it was assumed that there is only a 35% probability to perform an attack on a train. To apply the attack at a particular time step, the velocity of the train was changed over the next time step(s). Based on the attack type, a random percentage between 20% and 40% of the recommended velocity was added or subtracted.

TraCI provides the ability of changing the velocity over several time steps. In the simulation, the attack was performed by changing the velocity over a random number of time steps, between 1 and 3. Using the above setup, three experiments were performed. In the first experiment the simulation attacked the trains only by down speeding. In the second experiment, only over speeding, and the third experiment both. The datasets generated by SUMO for each simulation were split as 80% for training and 20% for testing. Furthermore, hyper-parameter tuning was performed to obtain the optimal values for the hyper-parameters. In the feature vector, the time step at which mobility data were received from a train, the train id, the differences in displacement, velocity, and acceleration from the previous time step, and the computed plausibility score of the received mobility data were all included.

To detect stealthy attacks, three different Machine Learning (ML) classifiers were applied to compare their performance. These classifiers are K-Nearest Neighbours (KNN), Random Forest (RF), and Naive Bayes (NB). KNN is a straightforward classifier that classifies an attribute based on the most dominant class among its nearest neighbors. NB classifies attributes by assigning probabilities using the Bayesian probabilistic model. It is called "naïve" because it assumes that the features are not correlated and are independent from each other. Random Forest employs decision trees for classification and classifies based on a majority voting by all trees.

To evaluate the effectiveness of the proposed plausibility checks, each experiment was preformed twice: with and without applying them. The results are shown in Table I. below:

TABLE 1

| | Without Plaus. Checks | | | With Plaus. Checks | | |
|---|---|---|---|---|---|---|
| Experiment | KNN | NB | RF | KNN | NB | RF |
| Down-speeding | 0.75 | 0.83 | 0.94 | 0.75 | 0.86 | 0.95 |
| Over-speeding | 0.97 | 0.97 | 0.99 | 0.97 | 0.98 | 0.99 |
| All attacks | 0.73 | 0.89 | 0.97 | 0.73 | 0.90 | 0.97 |

Table 1 shows the classification accuracy of each model which represents the ratio of the correctly classified observations to the total observations. KNN performed the worst among all models while RF performed the best, regardless of whether plausibility checks were applied or not. Therefore, RF was the most accurate in detecting attacks and classifying them into down speeding and over speeding. RF performed the best because the features in the feature vector give prediction indications, especially the plausibility score and the deviations in mobility data. This helps trees to converge in the correct direction. NB performed worse than RF because it assumes that the features are independent, which is incorrect in this case. KNN performed the worst because it classifies an instance based on the majority of its nearest neighbors. However, as explained before, the dataset includes randomness to make the attack stealthy. Even if a train is marked to be attacked in a certain round, there is a 65% probability not to perform the attack. Thus, the train will not be attacked in every time step. This decreases the classification accuracy that depends on classes of the majority of the nearest neighbors because they will not give accurate prediction indications.

Comparing the results of the experiments with and without plausibility checks, we find that these checks helped in improving the classification accuracy by 1% to 3% for the NB and RF classifiers. The simulation time of each experiment and the number of collisions that occurred in each of these experiments is shown in Table 2 below.

TABLE 2

| Experiment | Simulation Time | Collisions |
|---|---|---|
| Down-speeding | 2:09 min | 1 |
| Over-speeding | 1:35 min | 6 |
| All attacks | 2:12 min | 12 |

These collisions verify that the proposed attack model can cause hazardous consequences in trains networks. It was noted that over speeding caused more collisions and that down speeding caused delays in the trains' operations. Moreover, applying both attacks resulted in more delays and much more collisions.

The disclosed implementations detect stealthy attacks on traction and braking operations of trains at an early stage and can provide alerts to the control center and the driver to implement fail-safe measures. Such attacks can take place without the driver noticing, until an accident occurs. Therefore, the disclosed implementations are effective in protecting the safety of trains' operations and avoiding hazardous incidents. The IDS of the disclosed implementations can be into individual trains and/or wayside components. Although the impact of the system might be more limited when installed on a single train, the advantages of distributed security technology and additional checks at the edge of control are significant.

Computing systems and/or logic referred to herein can comprise an integrated circuit, a microprocessor, a personal computer, a server, a distributed computing system, a communication device, a network device, or the like, and various combinations of the same. A computing system or logic may also comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), optical circuits, and/or other devices configured for storing analog or digital information, such as in a database. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data.

The logic discussed herein, referred to as "modules", may include hardware, firmware and/or software stored on a non-transient computer readable medium. This logic may be implemented in an electronic device to produce a special purpose computing system. The systems discussed herein optionally include a microprocessor configured to execute any combination of the logic discussed herein. The methods discussed herein optionally include execution of the logic by said microprocessor. The disclosed implementations are described as including various "modules", "engines", and "logic", all of which refer to executable code and a computer hardware processor for executing the code to accomplish the described functionality. The Data Storage may be distributed throughout several computing devices.

It will be appreciated by those skilled in the art that changes could be made to the implementations described above without departing from the broad inventive concept thereof. It is understood, therefore, that this invention is not limited to the particular implementations disclosed, but it is intended to cover modifications within the spirit and scope of the present invention as defined by the appended claims.

What is claimed:

1. An intrusion detection method for detecting attacks on train operations which are performed by an onboard train control component, the method comprising:
   receiving control message history information indicating previously generated operational commands for directing operations on one or more trains;
   receiving mobility data of the one or more trains;
   performing a first intrusion check for attacks on a specific train based on the mobility data and position, displacement, velocity and/or acceleration of the specific train;
   performing a second intrusion check by applying a machine learning engine to the variance of displacement, velocity, and acceleration of the specific train at predetermined times, locations, or scenarios to classify the mobility data into normal mobility data and attacking mobility data; and
   generating an attack message when at least one of the first intrusion check and the second intrusion check indicate an attack whereby the attack message can be used to mitigate damage resulting from the attack.

2. The method of claim 1, wherein the second intrusion detection step comprises determining a plausibility of normal train operation based on the variance between difference between each of the displacement, the velocity, and the acceleration of the specific train between the two predetermined times.

3. The method of claim 1, wherein the first intrusion check and the second intrusion check steps are accomplished in parallel.

4. The method of claim 1, wherein the operational commands include Movement Authorities (MAs) and/or Speed Restriction Profiles (SRPs).

5. The method of claim 1, wherein the mobility data includes position, displacement, velocity and/or acceleration information.

6. The method of claim 1, wherein the step of performing a first intrusion check is accomplished in accordance with the following equations;

$$d^t \in [d_{min}^t, d_{max}^t] \quad (1)$$

$$v^t \in [v_{min}^t, v_{max}^t] \quad (2)$$

$$\alpha^t \in [\alpha_{min}^t, \alpha_{max}^t] \quad (3)$$

where the displacement, velocity, and acceleration of an arbitrary train at time step t are $d^t$, $v^t$, and $a^t$, respectively.

7. The method of claim 6, wherein the step of performing a second intrusion check is accomplished by determining the difference between the difference between each of the displacement, the velocity, and the acceleration of the specific train between the two predetermined times in accordance with the following equations:

$$\Delta d^{t,t-1} = d^t - d^{t-1} \quad (4)$$

$$\Delta v^{t,t-1} = v^t - v^{t-1} \quad (5)$$

$$\Delta \alpha^{t,t-1} = \alpha^t - \alpha^{t-1} \quad (6).$$

8. The method of claim 1, wherein the Machine Learning engine includes a model that is at least one of K-Nearest Neighbors (KNN), Random Forest (RF), and Naive Bayes (NB).

9. The method of claim 1, wherein the steps are accomplished by wayside components.

10. The method of claim 1, wherein the onboard train control component is a Train Control and Monitoring System (TCMS).

11. A computing system for detecting attacks on train operations which are performed by an onboard train control component, the system comprising:
    at least one computer processor;
    at least one memory device having executable instructions stored thereon which, when executed by the at least one computer processor, cause the at least one computer processor to carry out a method comprising:
        receiving control message history information indicating previously generated operational commands for directing operations on one or more trains;
        receiving mobility data of the one or more trains;
        performing a first intrusion check for attacks on a specific train based on the mobility data and position, displacement, velocity and/or acceleration of the specific train;
        performing a second intrusion check by applying a machine learning engine to the variance of displacement, velocity, and acceleration of the specific train at predetermined times, locations, or scenarios to classify the mobility data into normal mobility data and attacking mobility data; and
        generating an attack message when at least one of the first intrusion check and the second intrusion check indicate an attack whereby the attack message can be used to mitigate damage resulting from the attack.

12. The system of claim 10, wherein the second intrusion detection step comprises determining a plausibility of normal train operation based on the variance between difference between each of the displacement, the velocity, and the acceleration of the specific train between the two predetermined times.

13. The system of claim 10, wherein the first intrusion check and the second intrusion check steps are accomplished in parallel.

14. The system of claim 10, wherein the operational commands include Movement Authorities (MAs) and/or Speed Restriction Profiles (SRPs).

15. The system of claim 10, wherein the mobility data includes position, displacement, velocity and/or acceleration information.

16. The system of claim 10, wherein the step of performing a first intrusion check is accomplished in accordance with the following equations;

$$d^t \in [d_{min}^t, d_{max}^t] \quad (1)$$

$$v^t \in [v_{min}^t, v_{max}^t] \quad (2)$$

$$\alpha^t \in [\alpha_{min}^t, \alpha_{max}^t] \quad (3)$$

where the displacement, velocity, and acceleration of an arbitrary train at time step t are $d^t$, $v^t$, and $a^t$, respectively.

17. The system of claim 16, wherein the step of performing a second intrusion check is accomplished by determining the difference between the difference between each of the displacement, the velocity, and the acceleration of the specific train between the two predetermined times in accordance with the following equations:

$$\Delta d^{t,t-1} = d^t - d^{t-1} \quad (4)$$

$$\Delta v^{t,t-1} = v^t - v^{t-1} \quad (5)$$

$$\Delta \alpha^{t,t-1} = \alpha^t - \alpha^{t-1} \quad (6).$$

18. The system of claim 10, wherein the Machine Learning engine includes a model that is at least one of K-Nearest Neighbors (KNN), Random Forest (RF), and Naive Bayes (NB).

19. The system of claim 10, wherein the steps are accomplished by wayside components.

20. The system of claim 10, wherein the onboard train control component is a Train Control and Monitoring System (TCMS).

* * * * *